United States Patent [19]

Regan et al.

[11] 3,899,437

[45] Aug. 12, 1975

[54] DENTURE CLEANING COMPOSITION CONTAINING PHOSPHORIC ACID

[76] Inventors: Barrie F. Regan, 1760 Manor Dr., Hillsborough, Calif. 94010; Glen B. Regan, 1451 Beach Park Blvd. No. 203, Foster City, Calif. 94404

[22] Filed: Mar. 12, 1973

[21] Appl. No.: 340,326

[52] U.S. Cl. ............... 252/106; 252/136; 252/528; 252/140; 252/145; 252/547; 424/52; 424/54
[51] Int. Cl. .............................................. C11d 3/48
[58] Field of Search ........... 252/106, 136, 528, 547, 252/140, 143–145; 424/52, 54

[56] References Cited
UNITED STATES PATENTS

| | | | |
|---|---|---|---|
| 3,518,343 | 6/1970 | Welsh et al. | 252/106 X |
| 3,652,420 | 3/1972 | Hill | 252/143 X |
| 3,655,579 | 4/1972 | Crotty et al. | 252/136 X |
| 3,733,277 | 5/1973 | Wooden et al. | 252/136 X |
| 3,785,986 | 1/1974 | Lauster | 252/136 |
| 3,822,212 | 7/1974 | Bryant et al. | 252/136 |

OTHER PUBLICATIONS

Rose et al., The Condensed Chemical Dictionary, 4th Ed., p. 220, Reinhold Publishing Corporation (1950) New York.

*Primary Examiner*—Benjamin R. Padgett
*Assistant Examiner*—E. A. Miller

[57] ABSTRACT

Denture cleaning compositions comprising dilute aqueous solutions of orthophosphoric acid and a non-ionic detergent are disclosed. These compositions are modified to form slurry or pasty products by addition of diatomaceous earth, glycerine, and a xanthan gum.

2 Claims, No Drawings

DENTURE CLEANING COMPOSITION CONTAINING PHOSPHORIC ACID

SUMMARY OF THE INVENTION

This invention relates to denture cleaning compositions based on the use of phosphoric acid to attack and remove hard calculus from dentures, the acid attack is promoted by the employment of a non-ionic detergent to wet and facilitate acid contact with the denture surface and by the employment of a quaternary ammonium (cationic) germicide to kill odor causing bacteria. The cleaning solution consisting of these three essential components can be modified by the addition of diatomaceous earth, glycerine and a xanthan gum to form a stable slurry or paste. The paste can be used either to clean dentures by brushing and then water washing or as the cleaning composition in the periodic cleanings of teeth by dentists as a part of the usual dental health program.

DETAILED DESCRIPTION OF THE INVENTION

The following examples illustrate typical effective cleaning compositions, the first example illustrating a representative cleaning solution and the second a representative cleaning paste.

EXAMPLE I

The following composition was prepared:

| COMPONENT | CONCENTRATION WT. |
| --- | --- |
| Food grade orthophosphoric acid 75% concentration | 3.5% |
| Nonyl phenol polyglycol ether[1] (11 moles ethylene oxide/mol nonyl phenol) | 0.635% |
| Methyl Orange | 0.0005% |
| BTC - 2125 M[2] | 0.01875% |
| Oil of Peppermint | 0.012% |

[1]Sold under name Neutronyl 656 by Onyx Chemical Co.
[2]Sold by Onyx Chemical Co. and consists of a mixture $C_{14}$ alkyl, dimethyl benzyl ammonium chloride and $C_{12}$ alkyl, dimethyl ethyl ammonium chloride.

The methyl orange and oil of peppermint provide color and flavor.

The composition of Example 1 was used to clean dentures by immersing the denture in the solution for 3 to 5 minutes and then brushing lightly under running water to remove loosened contaminants and to remove the bulk of the cleaning composition from the denture surface. The composition dissolves hard calculus, removes food and tobacco stains and kills bacteria which cause denture odor.

The composition of Example 1 is a typical effective cleaning solution. The proportions of the components can be varied within rather narrow limits as follows:

| | |
| --- | --- |
| orthophosphoric acid | 1.5 to 3.5% by weight |
| quaternary ammonium germicide | 0.01 to 0.04 by weight |
| non-ionic detergent | 0.5 to 1.5% by weight | to produce efficient cleaning solutions.

EXAMPLE 2

The following composition was prepared:

| COMPONENT | CONCENTRATION WT. |
| --- | --- |
| Diatomaceous Earth | 30.00% |
| Orthophosphoric Acid (Food Grade 75%) | 2.194 |
| Nonylphenol Polyglycolether (11 moles Ethylene oxide/1 mole nonyl phenol) | 0.388 |
| Glycerine USP | 7.71 |
| BTC - 2125 (Ex2) | 0.023 |
| Xanthan gum(1) | 0.457 |
| Peppermint oil | 0.122 |
| Red dye | 0.0058 |
| Sodium Saccharin | 0.41 |
| Water | to total 100% |

1. The xanthan gum functions as a suspending agent which prevents settling out of the diatomaceous earth. A number of materials which function in other environments as suspending agents were tested but only the xanthan gums gave permanent suspension of the diatomaceous earth. When the others were used the diatomaceous earth settled out, usually within 48 hours perhaps because of acid attack on the suspending agent. A xanthan gum sold by Kelco Company under the name of Keltrol is especially effective. The xanthan gums are high molecular weight (ca. 1,000,000) polysaccharide gums produced by fermenting hexoses with the organism xanthamonous compestuous. The fermentation product gum may be modified by actylation if desired.

After the above components were intimately mixed a smooth stable paste having a consistency about that of sour cream was obtained. The paste is storage stable and no settling of the diatomaceous earth occurs on long standing.

The composition of Example 2 has been used to clean dentures by brushing the denture with the paste and then washing with water. The composition has also been used in an evaluation program by some 25 dentists as the cleaning agent for the semi-annual or annual cleanings scheduled for most dental patients. The results have been uniformly excellent and the composition of Example 2 has been considered superior to the usual cleaning agents by both dentists and patients.

The composition of Example 2 is a representative cleaning paste. The proportions of the essential components can be varied within rather narrow ranges as follows:

| | |
| --- | --- |
| diatomaceous earth | 25 – 35% by weight |
| glycerine | 5 – 10% by weight |
| xanthan gum | 0.3 – 1.5% by weight |
| orthophosphoric acid | 1 – 3% by weight |
| non-ionic detergent | 0.25–1.5% by weight |
| Quaternary ammonium germicide | 0.01–1.5% by weight |
| water | to total 100% |

These paste compositions may also be carefully modified by including from about 1 to 3% by weight, based on the total composition, of a soluble fluoride such as stannous flouride, stannous chloroflouride, sodium flouride orthophosphate or potassium flourostannate to inhibit development of caries.

The composition of Example 2 has a number of advantages over the pumice and zirconia base pastes now in use. The diatomaceous earth is effective but less abrasive than pumice, being a softer material. The diatomaceous earth absorbs the liquid portion of the composition so that the particles are somewhat self lubricating and less heat is generated during polishing. The phosphoric acid aided by the non-ionic detergent dissolves calculus and plaque so that less cleaning by abrasion is necessary. While the pH of the composition is low the acid seems to be selectively absorbed to some degree by the diatomaceous earth so that cleaning of teeth with the paste does not result in any sensitivity such as lemon juice may cause.

We claim:

1. A tooth and denture cleaning composition consisting essentially of 1–3% by weight orthophosphoric acid, 0.25 to 1.5% by weight of a non-ionic detergent, 0.01 to 0.04% by weight of a quaternary ammonium germicide, 5 to 10% by weight glycerine, 25 to 35% by weight diatomaceous earth, 0.3 to 1.5% by weight of xanthan gum and the remainder water.

2. A composition as defined in claim 1 containing a soluble fluoride in amount sufficient to constitute 1 to 3% of the total composition.

* * * * *